(12) United States Patent
Reid

(10) Patent No.: US 9,116,067 B1
(45) Date of Patent: Aug. 25, 2015

(54) METHOD FOR DETECTING LEAKS AROUND SEALS

(76) Inventor: Robert G. Reid, Destin, FL (US)

(*) Notice: Subject to any disclaimer, the term of this patent is extended or adjusted under 35 U.S.C. 154(b) by 553 days.

(21) Appl. No.: 13/543,058

(22) Filed: Jul. 6, 2012

(51) Int. Cl.
*G01M 3/04* (2006.01)

(52) U.S. Cl.
CPC ........................ *G01M 3/04* (2013.01)

(58) Field of Classification Search
CPC ........ G01M 3/04; G01M 3/20; E04D 13/006; F41H 9/06; G01N 21/91
USPC .......................................................... 73/40.7
See application file for complete search history.

(56) References Cited

U.S. PATENT DOCUMENTS

| | | | | |
|---|---|---|---|---|
| 2,504,530 | A * | 4/1950 | Jacobs | 73/40.7 |
| 3,975,634 | A * | 8/1976 | Molina | 250/302 |
| 4,155,249 | A * | 5/1979 | Scott | 73/40.7 |
| 4,173,141 | A * | 11/1979 | Kissell et al. | 73/40.7 |
| 4,317,996 | A * | 3/1982 | Davis | 250/302 |
| 4,678,658 | A | 7/1987 | Casey et al. | |
| 4,748,847 | A | 6/1988 | Sheahan | |
| 4,771,608 | A | 9/1988 | Lin et al. | |
| 4,875,340 | A | 10/1989 | Lin et al. | |
| 5,335,536 | A | 8/1994 | Runnevik | |
| 6,354,139 | B1 * | 3/2002 | Menovick et al. | 73/40 |
| 6,361,024 | B1 | 3/2002 | Carson | |
| 6,392,227 | B1 | 5/2002 | Banyard et al. | |
| 6,477,890 | B1 * | 11/2002 | Hulsebus | 73/40.7 |
| 7,305,176 | B1 | 12/2007 | Pieroni | |
| 2010/0326171 | A1 | 12/2010 | Stauffer et al. | |
| 2011/0179854 | A1 * | 7/2011 | Brooks | 73/40.7 |
| 2011/0247399 | A1 * | 10/2011 | Schwartz et al. | 73/40.7 |

OTHER PUBLICATIONS

Harrje et al., "Reduction of Air Infiltration due to Window and Door Retrofits in an Older Home" May 1979, Center for Energy and Environmental Studies, Princeton University.*

Sparkenergy "Do It Yourself Tips: Detecting air leaks" Mar. 2011, web document.*

* cited by examiner

*Primary Examiner* — John Fitzgerald

(57) ABSTRACT

A method whereby a seal, such as a door or window seal including a joint or seam, is tested for leaks. An aerosol can has an environmentally safe propellant and a liquid therein that exits the can as a tracer mist, which tracer mist may contain a disappearing dye. The can is positioned on one side of the seal being tested and is sprayed at this side with the opposite side observed, either visually, or with the aid of a marker strip, in order to determine if any of the tracer mist passes from the one side of the seal to the other side.

7 Claims, 5 Drawing Sheets

METHOD FOR DETECTING LEAKS AROUND SEALS

BACKGROUND OF THE INVENTION

1. Field of the Invention

The present invention relates to a method whereby a seal, such as an installed window or door seal, weather stripping, caulking, membranes, welded joints, and riveted seams being used in such diverse applications as boat seams, roof seams, water tight containers and structures, etc., can be tested for leaks such that any leakage in the seal can be quickly and easily visually detected.

2. Background of the Prior Art

With energy prices steadily on the rise, people are ever more vigilant to saving on their various energy uses. From driving smaller cars and car pooling, or even taking mass transit whenever possible, to making their homes more energy efficient, energy savings has become the norm, even for people who do not otherwise consider themselves as being "green." Of course, energy savings translates into money savings and the more energy costs, the more is saved by implementing some basic savings protocols.

Home energy savings is multifaceted. One aspect of home energy savings involves replacing energy consuming appliances, both large and small, with modern more efficient units. Many homeowners are swapping out their old HVAC systems, that often has a rating of 10 SEER and that used electricity for heating, to modern units that have a rating of 15 to 16 SEER or even greater and that use either natural gas for heating or a more efficient heat pump system if natural gas is unavailable. Old washers and dryers are being replaced with modern "smart" units that increase efficiency and decrease energy use. Even the common incandescent light bulb is being replaced by the substantially more efficient CFL bulb.

Other home energy savings measures include increasing the amount of insulation in the attic so as to create a greater thermal barrier between the inside and outside of the house. New construction materials, which often include thermal barriers, are finding their way onto construction sites everywhere. Many homeowners are replacing older windows with newer models that may have double or even triple the R-value of windows that are just a few years old and still well within their life cycle.

It is within the windows and door seals as well as joints between sheetrock and flooring installed within buildings that a potential source of substantial energy loss is often overlooked. While a brand new double glazed vinyl or fiberglass window having low-E glass is substantially more efficient that a metal framed single glazed counterpart, if the window is not installed properly, much of the energy efficiency gain can be lost. If the window is not sealed properly, even a high end highly efficient window will not be performing up to peak efficiency. A small opening in the sealing may not appear to be much of a thermal transfer area, due to the pressure differential on either side of the window, a substantial amount of air moves through the opening (and thermal energy, either hot air coming in in the summer or leaving in the winter) resulting in increased heating or cooling costs. Many people can appreciate being near a window that whistles, especially when it is windy outside. While some such whistling may be due to poor window design, often the whistling is simply air rushing through a small opening in the seal that seals the window to the structure wherein the window is installed. Not only Is such an opening robbing the energy efficiency of the overall structure, such an opening may also allow moisture to penetrate inside the envelope of the building, which can lead to significant damage from mold and mildew, wood rot, etc., Problems with windows and doors sealing typically result from one of two factors. The seal may fail over time due to the aging and deterioration of the weather stripping and sealing caulk, especially, if an inferior grade was originally used. Sun and moisture, coupled with thermal expansion and contraction of the seal and the sealed members, all of which tend to have different expansion rates, can cause a seal to fail. Alternately, an improperly installed seal can also leave gaps (and possibly lead to seal failure down the road) in the seal making the seal inefficient. Although many window and door installers are quite conscientious about their work and desire to properly seal each window or window installed, many fly by nighters simply don't care so long as they can get paid and move on to the next job. However, even for installers and their contractors that take care to perform a proper job, the typical way to verify correct seals is through a visual inspection and while looking at each seal may flesh out obvious gaps, small gaps may go undetected. Within existing structures, paint or varnish that has been applied over time may visually cover seal failures.

Expensive commercial systems have been developed whereby seals about windows, doors, roof membranes, electrical plugs, etc., can be tested. Such devices, which rely on a tracer "gas" or fog or smoke, are complex in design and operation and tend to use chemicals that are hazardous and toxic so that only highly skilled professionals tend to employ such devices. As a result, seal testing can be a costly endeavor for a homeowner, especially one who fears that a "problem" will always be found, and use of such devices tends to not be economically sound for many.

Some home owners resort to spraying water from a hose at each seal being tested either from a water hose or worse from a pressure sprayer nozzle. While this home brewed method may reveal obvious seal problems, the method itself is problematic. The force of the water from a hose and especially from a pressure sprayer can damage an otherwise healthy seal (as well as other components nearby) and can also introduce sufficient water into the structure to cause additional damage. Additionally, the water coming from a hose or pressure sprayer is not sufficiently atomized to allow the water to pass through relatively small, yet problematic voids in the seal so that many seal problems go undetected.

As such many home owners simply put caulking on the windows every so often to fix any unknown problems that might exist. Not only is this an unnecessary deployment of labor and resources, layer upon layer of caulk around a window tends to look unsightly. As such, many home owners simply live with the problem until water damage discloses a sealing problem at a particular window.

What is needed is a system whereby contractors, homeowners and renters alike can quickly and easily test seals around doors, windows, and similar structures within, houses, apartments and office buildings without the need for specialized equipment or training so that improper seals can be remedied so as to realize greater energy efficiency and prevent possible future moisture damage.

SUMMARY OF THE INVENTION

The method for detecting leaks around seals of the present invention addresses the aforementioned needs in the art by providing a simple system whereby a seal (which includes seams and joints) is quickly tested for integrity so that if a problem within the seal is detected, remedial measures can be taken. The method for detecting leaks around seals is of simple design and delivery so that elaborate equipment need not be set up and the system can be practiced by most anyone without any specialized training. This helps minimize the costs of deploying the method for detecting leaks around seals so as to increase the pool of potential customers for this type of system.

The method for detecting leaks around seals of the present invention comprises the steps of providing an aerosol can containing a propellant and a liquid therein that is sprayed out of a nozzle of the can as a tracer mist under the force of the propellant. The nozzle of the can has a small diameter tube inserted thereinto and is positioned directly against the seal or joint to allow sufficient force for the mist to pass through a void in the seal from the first side of the seal. A trigger mechanism on the can is depressed in order to activate and control the discharge of tracer mist from the can at the first side of the seal. The second side of the seal is observed for any occurrence of the tracer mist coming through the second side of the seal. The liquid, and thus the tracer mist expelled from the can, may contain a disappearing dye. Optionally, a marker strip can be provided and positioned against the second side of the seal prior to the step of discharging the tracer mist at the first side of the seal. If desired, the nozzle tube is positioned at the second side of the seal and trigger is depressed in order to discharge the tracer mist at the second side of the seal subsequent to the step of discharging the tracer mist at the first side of the seal. If these optional steps are taken, and the marker strip is used, the marker strip is positioned against the first side of the seal prior to step of discharging the tracer mist at the second side of the seal and subsequent to the step discharging the tracer mist at the first side of the seal. The trigger can be a typical push button type trigger or a "pistol" type trigger as have become popular in recent years, which pistol type triggers give a user more control over output discharge rate from the can.

BRIEF DESCRIPTION OF THE DRAWINGS

Similar reference numerals refer to similar parts throughout the several views of the drawings.

DESCRIPTION OF THE PREFERRED EMBODIMENT

Figure 1:
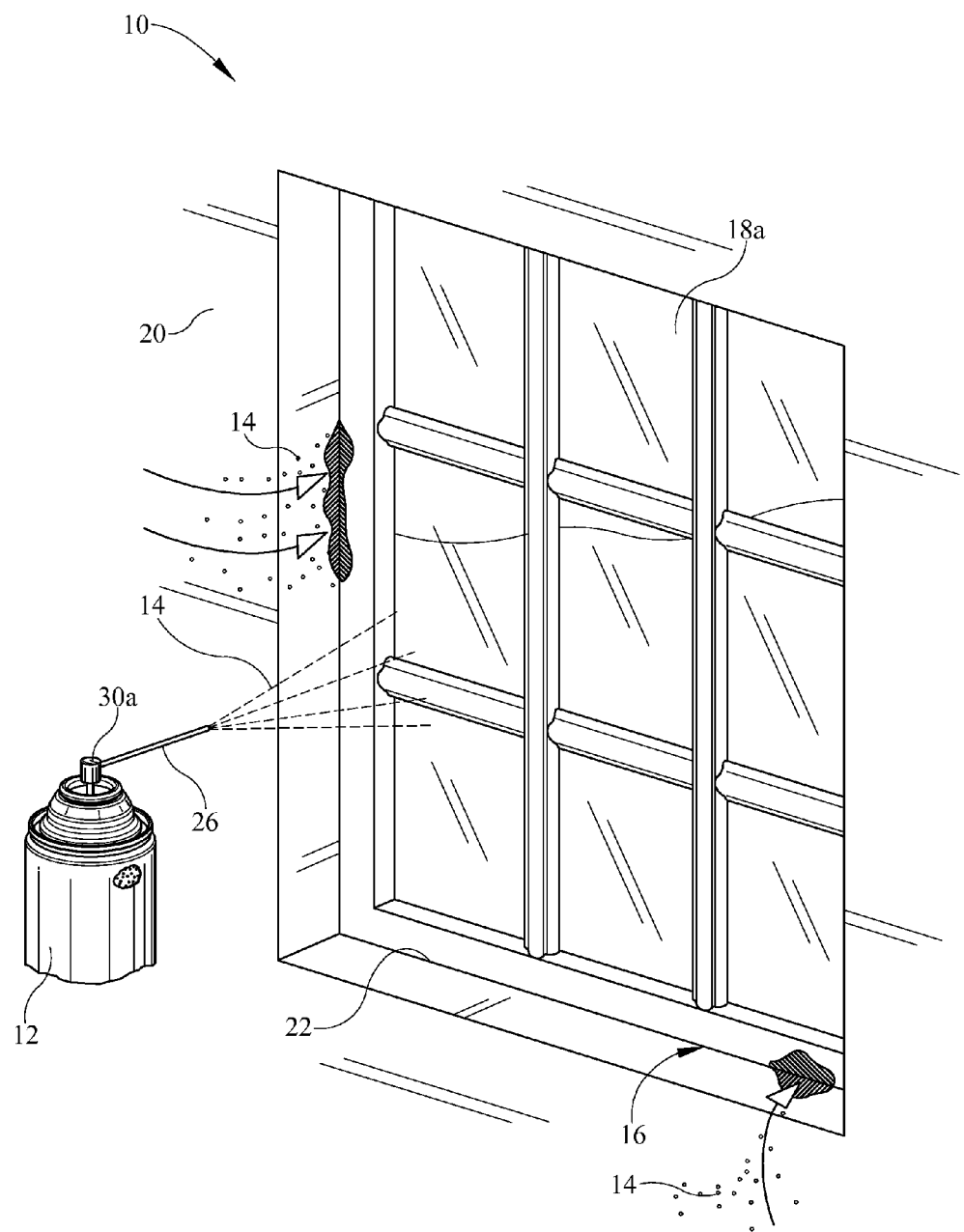
FIG. 1 is an environmental view of the method for detecting leaks around seals of the present invention being deployed upon a window from within the structure whereat the window is installed.
Figure 2:
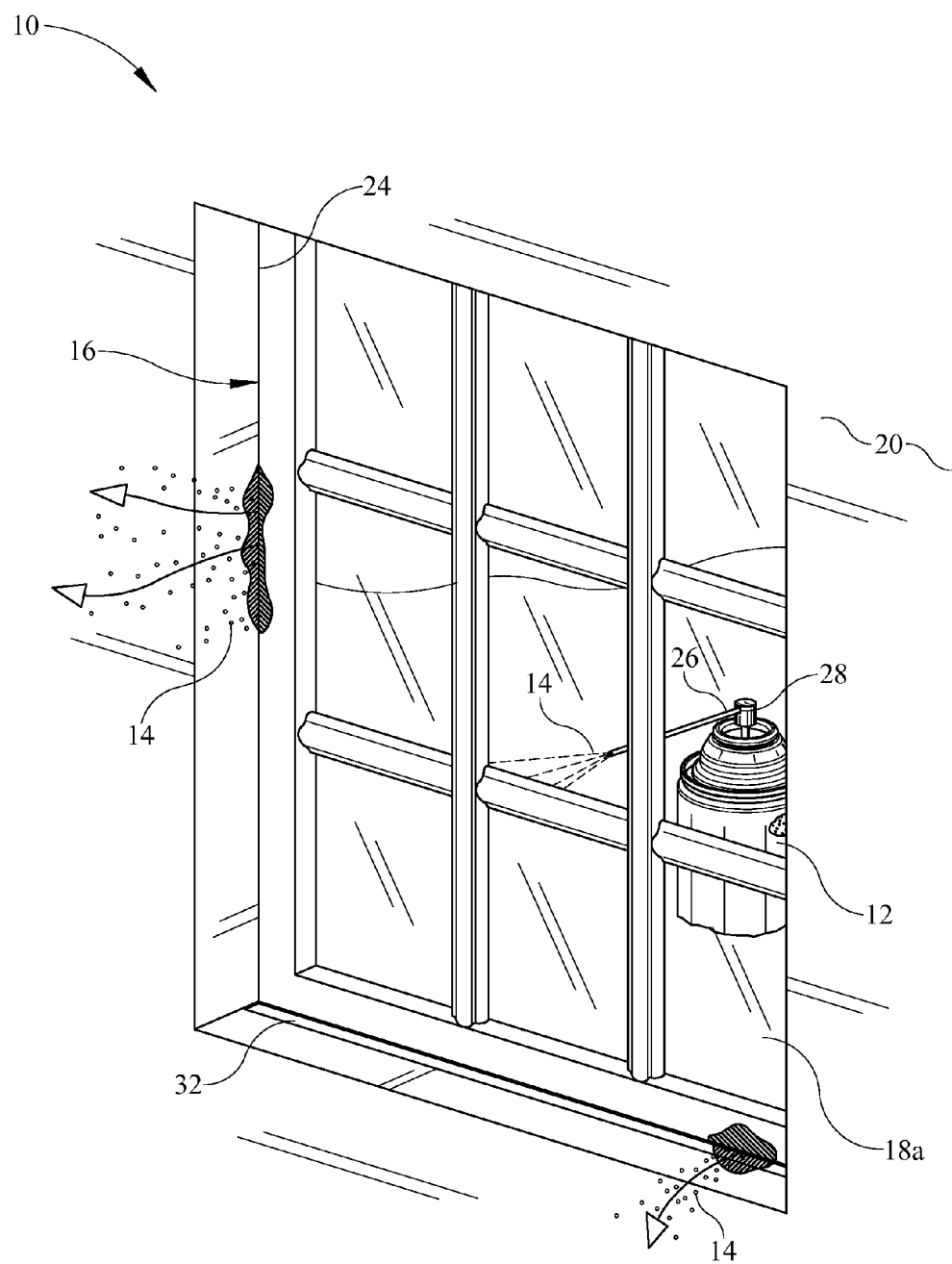
FIG. 2 is an environmental view of the method for detecting leaks around seals being deployed upon a window from outside of the structure whereat the window is installed.
Figure 3:
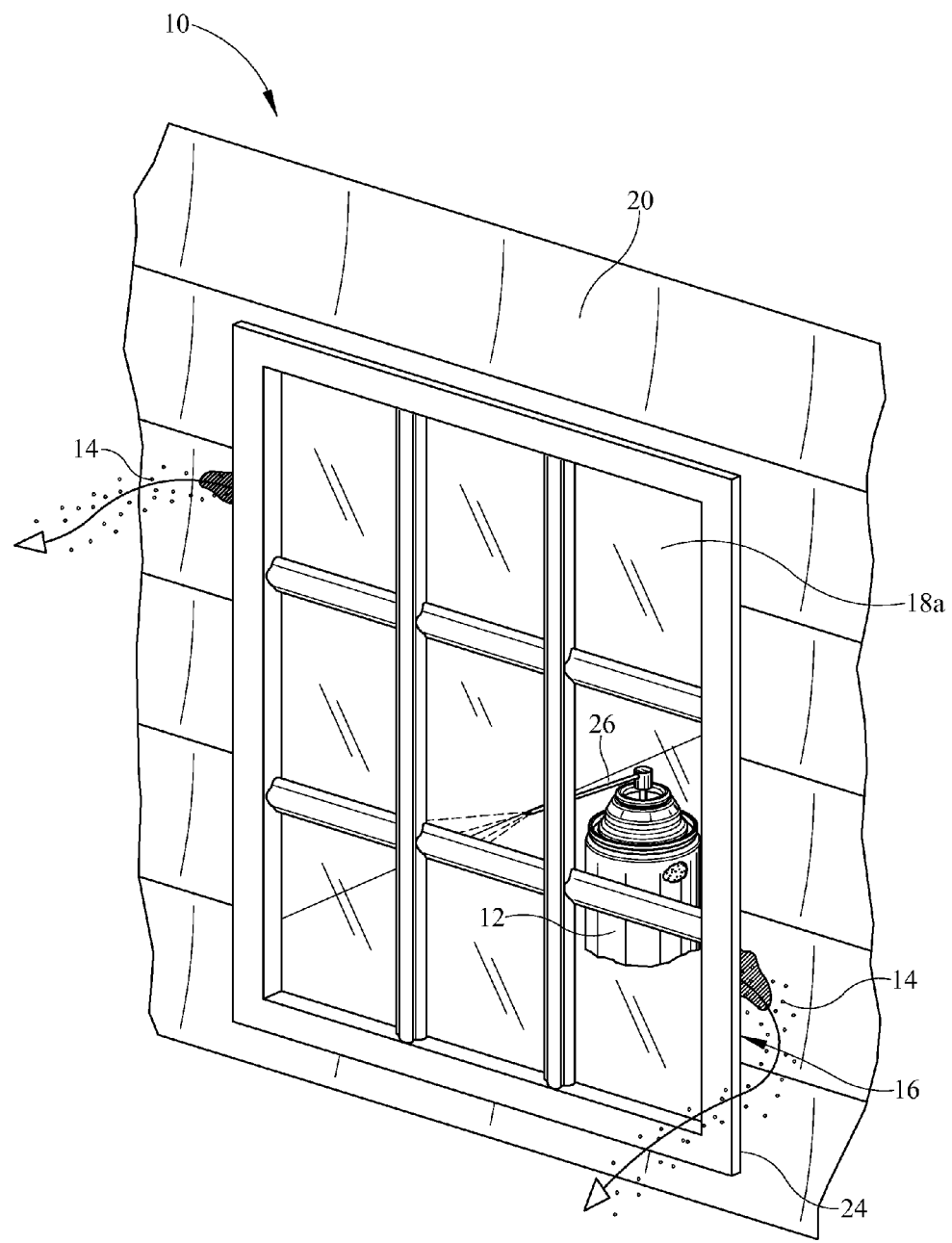
FIG. 3 is an environmental view of the method for detecting leaks around seals being deployed upon a different type of installed window from within the structure whereat the window is installed.
Figure 4:
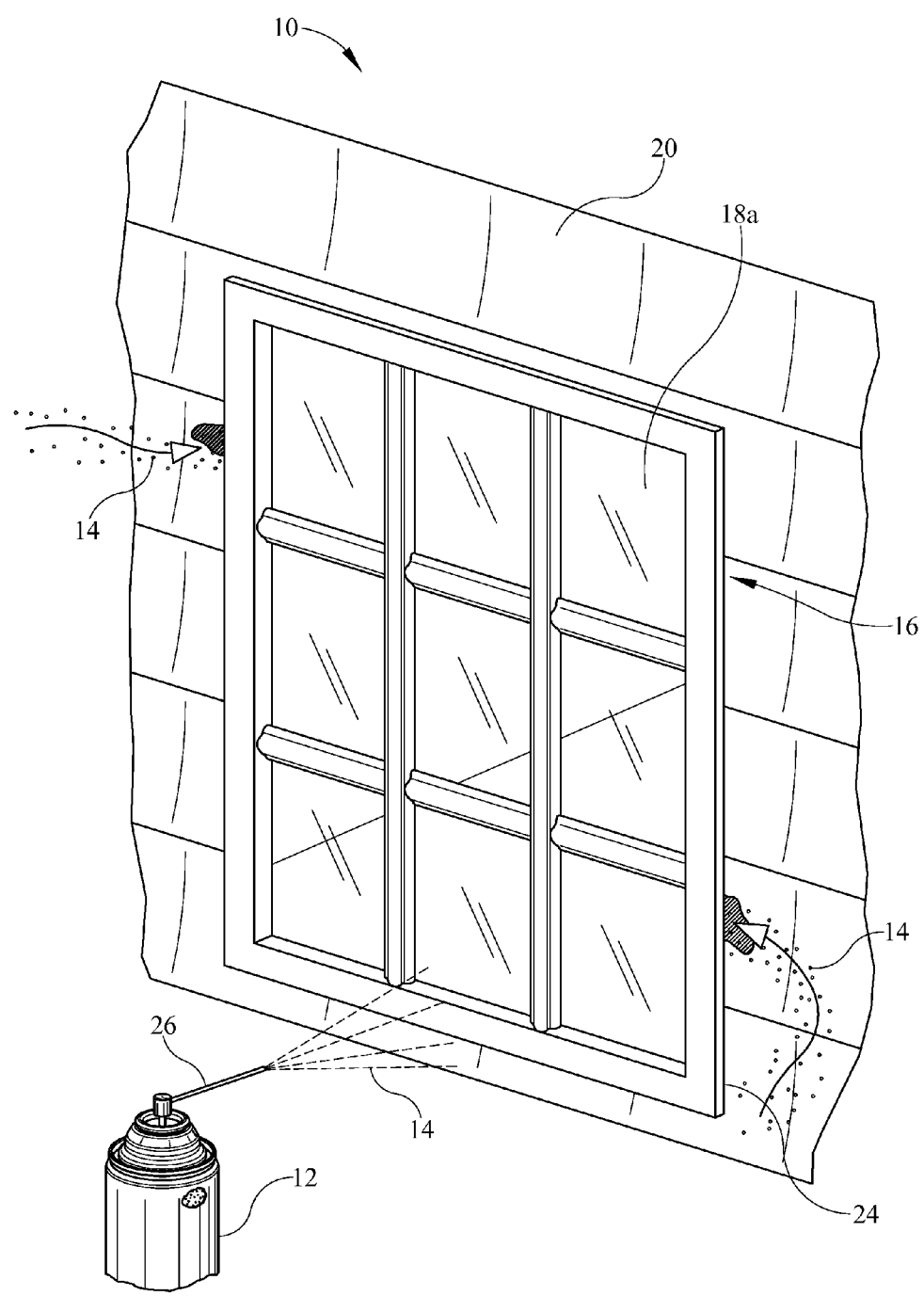
FIG. 4 is an environmental view of the method for detecting leaks around seals being deployed upon the window of FIG. 3, from outside of the structure whereat the window is installed.

Referring now to the drawings, it is seen that the method for detecting leaks around seals of the present invention, generally denoted by reference numeral 10, is comprised of a providing an aerosol can 12 having a propellant and liquid therein, which when the can 12 is activated, the liquid exits the can 12 as a tracer mist 14, under the force of the propellant, the propellant advantageously being of an environmentally friendly composition. Such a mist 14 can include fog or smoke and can have a dye therein, such a dye would be one that disappears shortly after being released from the aerosol can 12 whenever the dye dries. Such a disappearing dye is taught in U.S. Pat. No. 4,678,658 to Casey et al., issued on Jul. 7, 1987, which disclosure is incorporated herein by reference. Of course, such a mist 14 would need not contain the germicidal properties.

Figure 5:
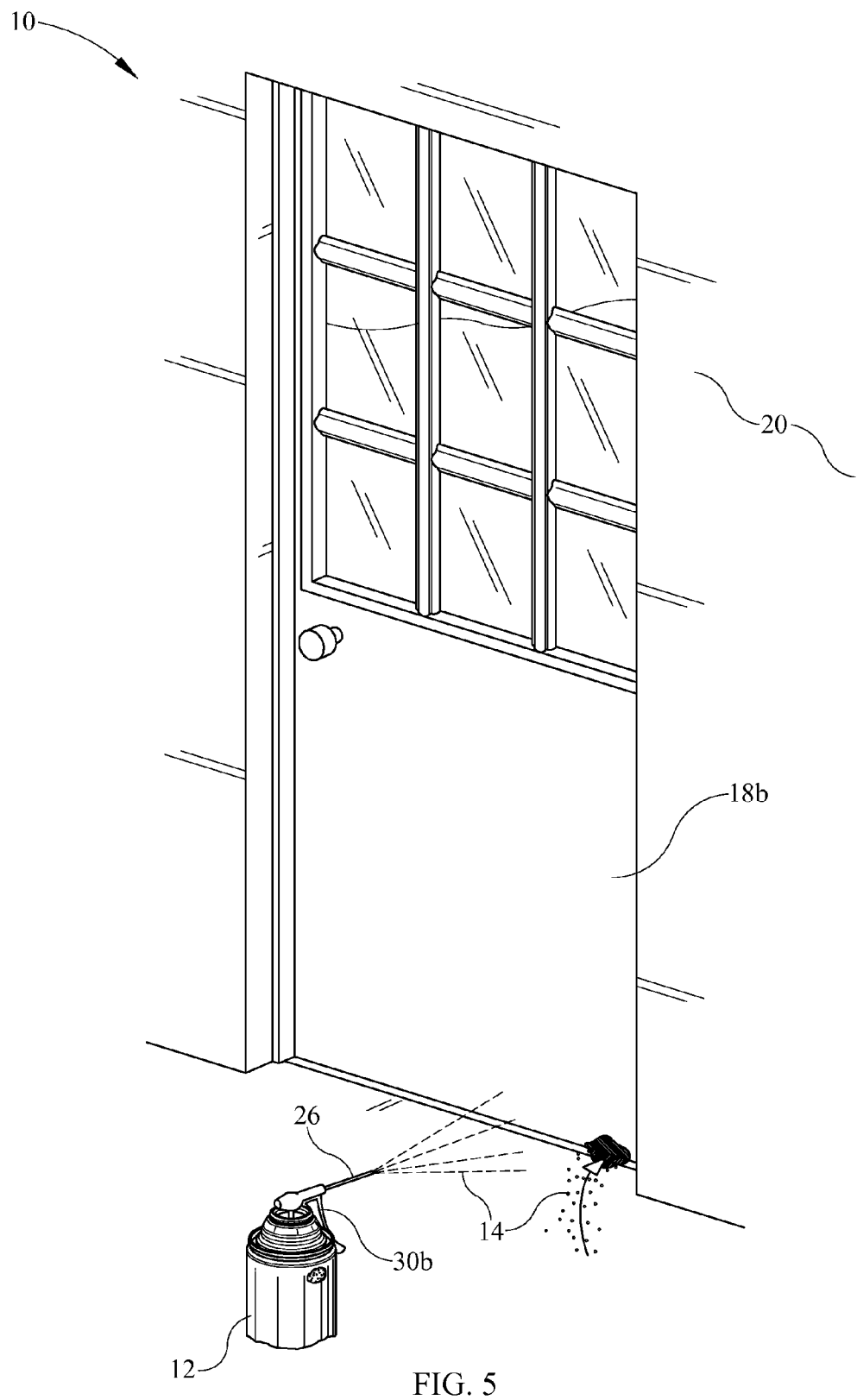
FIG. 5 is an environmental view of the method for detecting leaks around seals being deployed upon a door seal.

The method for detecting leaks around seals 10 is implemented by selecting a seal 16, that seals an appropriate element such as the illustrated window 18a or door 18b installed within a building 20, but can include any seal (defined to include seams and joints), such as an installed window or door seal, weather stripping, caulking, welded joins, and riveted seams used in such diverse applications as boat seams, roof seams, roof membrane seals, seals around ducts, such as electrical or plumbing, etc., basically wherever a seal is located. The seal 16 has a first side 22, such as the inside portion of the window 18a in the figures and a second side 24, such as the outside of the window 18a. The aerosol can 12 is shaken as appropriate and a nozzle tube 26 (essentially a very narrow diameter straw) is positioned within the discharge nozzle 28 and the opposing end of the nozzle tube 26 is positioned against the seal 16 being tested on one of the sides 22 or 24, and is aimed thereat. The trigger of the can, which can include the typical push button trigger 30a as illustrated in FIGS. 1-4 or the pistol type trigger 30b illustrated in FIG. 5, is activated in order to spray the contents from the can 12 under the force of the propellant at the seal 16. The tracer aerosol mist 14 exits the can 12 from the nozzle 28 and passes through the nozzle tube 26 and exits the nozzle tube 26 with sufficient force as is typical for aerosol sprayers and the aerosol mist 14 is sufficiently atomized so that if the seal 16 has a void that passes between the two sides 22 and 24, some of the aerosol mist 14 passes through the void and comes out the side of the seal 16 opposite from the side whereat the aerosol can 12 is being deployed. A simple observation detects the presence of the aerosol mist 14 on this opposing side. If the aerosol mist 14 has a disappearing dye therein, then the dye makes visual verification of the mist 14 being on the opposite side, yet the dye disappears in short order so as to not leave an undesired colorant on the structure being tested.

If need be, two individuals can be used to perform the method for detecting leaks around seals 10, one individual on one side 22 of the seal 16, the other individual on the opposite side 24 of the seal 16, so that one person sprays the mist 14 onto the seal 16 and the other individual on the opposite side observes if any of the mist 14 passes through the seal 16. The use of two individuals is called for whenever the structure associated with the seal 16 is not sufficiently transparent so as to allow a single person to see the mist on the opposite side of the seal 16 from whereat the mist 14 is being sprayed. For example, a door 18b may lack sufficient transparency for a single person to see to the opposite side of the door to effectively gauge whether any mist 14 is passing through the seal 16 or at what location along the seal 16.

Alternately, a marker strip 32 can be placed along the side 22 or 24 of the seal 16, opposite the side 24 or 22 of the seal 16 whereat the mist 14 is sprayed. Such a marker strip 32 can be paper, such as tissue paper, paper tape, material that changes color if it becomes moist, etc., so that a single individual can perform the method for detecting leaks around seals 10 by placing the marker strip 32 along the seal 16 to be tested on one of the sides 22 or 24 thereof, then spraying the mist 14 at the seal 16 on the opposite side 24 or 22 of the seal 16. Once mist spraying is completed, the individual then goes to the opposite side to observe the marker strip 32 for signs of moisture thereon (and possibly still some of the disappearing dye), which moisture is indicative of the mist 14 passing through the seal 16 and thus a problem with the seal 16 at the moisture location spot.

As a given void in a seal 16 may be asymmetrical between its two sides 22 and 24 (for example, the void may be a pin hole on one side and a much larger cavity on the other side), then the seal 16 may be tested from each of the two sides 22 and 24, first spraying the first side 22 and observing the second side 24, and thereafter spraying the second side 24 and observing the first side 22.

Of course when a seal 16 failure is noted by the method for detecting leaks around seals 10, appropriate remedial action is.

While the invention has been particularly shown and described with reference to an embodiment thereof, it will be appreciated by those skilled in the art that various changes in form ad detail may be made without departing from the spirit and scope of the invention.

I claim:

1. A method for testing a seal for a leak, the seal having a first side and a second side, the method comprising the steps of:
   providing a marker strip; and positioning the marker strip juxtaposed the second side of the seal;
   providing an aerosol can having a propellant and a liquid therein such that the liquid is sprayed out of a nozzle of the can as a tracer mist under the force of the propellant whenever a trigger of the can is activated;
   providing a nozzle tube and positioning the nozzle tube within the nozzle of the can; and
   positioning the nozzle tube adjacent the first side of the seal and activating the trigger in order to discharge the tracer mist out of the nozzle through the nozzle tube at the first side of the seal; observing any changes in the marker strip and determining if a leak in the seal is present based on the observed any changes.

2. The method as in claim 1 further comprising the step of positioning the nozzle a adjacent the second side of the seal and activating the trigger in order to discharge the tracer mist at the second side of the seal subsequent to the step of discharging the tracer mist at the first side of the seal.

3. The method as in claim 1 wherein the tracer mist contains a disappearing dye.

4. The method as in claim 3 further comprising the step of positioning the nozzle tube adjacent the second side of the seal and activating the trigger in order to discharge the tracer mist at the second side of the seal subsequent to the step of discharging the tracer mist at the first side of the seal.

5. The method as in claim 4 further comprising the step of positioning the marker strip juxtaposed the first side of the seal prior to step of discharging the tracer mist at the second side of the seal and subsequent to the step discharging the tracer mist at the first side of the seal.

6. The method as in claim 1 further comprising the step of positioning the nozzle a adjacent the second side of the seal and activating the trigger in order to discharge the tracer mist at the second side of the seal subsequent to the step of discharging the tracer mist at the first side of the seal.

7. The method as in claim 6 further comprising the step of positioning the marker strip juxtaposed the first side of the seal prior to step of discharging the tracer mist at the second side of the seal and subsequent to the step discharging the tracer mist at the first side of the seal.

\* \* \* \* \*